H. J. LUFF.
RESEALING TRAP.
APPLICATION FILED JUNE 17, 1907. RENEWED NOV. 20, 1908.

927,419.  Patented July 6, 1909.

WITNESSES:
C. M. Fisher
F. C. Museum

INVENTOR.
Henry J. Luff.
BY
Fisher & Moore
ATTORNEYS.

UNITED STATES PATENT OFFICE.

HENRY J. LUFF, OF CLEVELAND, OHIO.

RESEALING-TRAP.

No. 927,419.　　　　Specification of Letters Patent.　　　　Patented July 6, 1909.

Application filed June 17, 1907, Serial No. 379,298. Renewed November 20, 1908. Serial No. 463,712.

*To all whom it may concern:*

Be it known that I, HENRY J. LUFF, a citizen of the United States, residing at Cleveland, in the county of Cuyahoga and State of Ohio, have invented certain new and useful Improvements in Resealing-Traps, and do declare that the following is a full, clear, and exact description of the invention, which will enable others skilled in the art to which it appertains to make and use the same.

My invention relates to a resealing trap, all as hereinafter fully described and particularly set forth in the claim.

Figure 1:
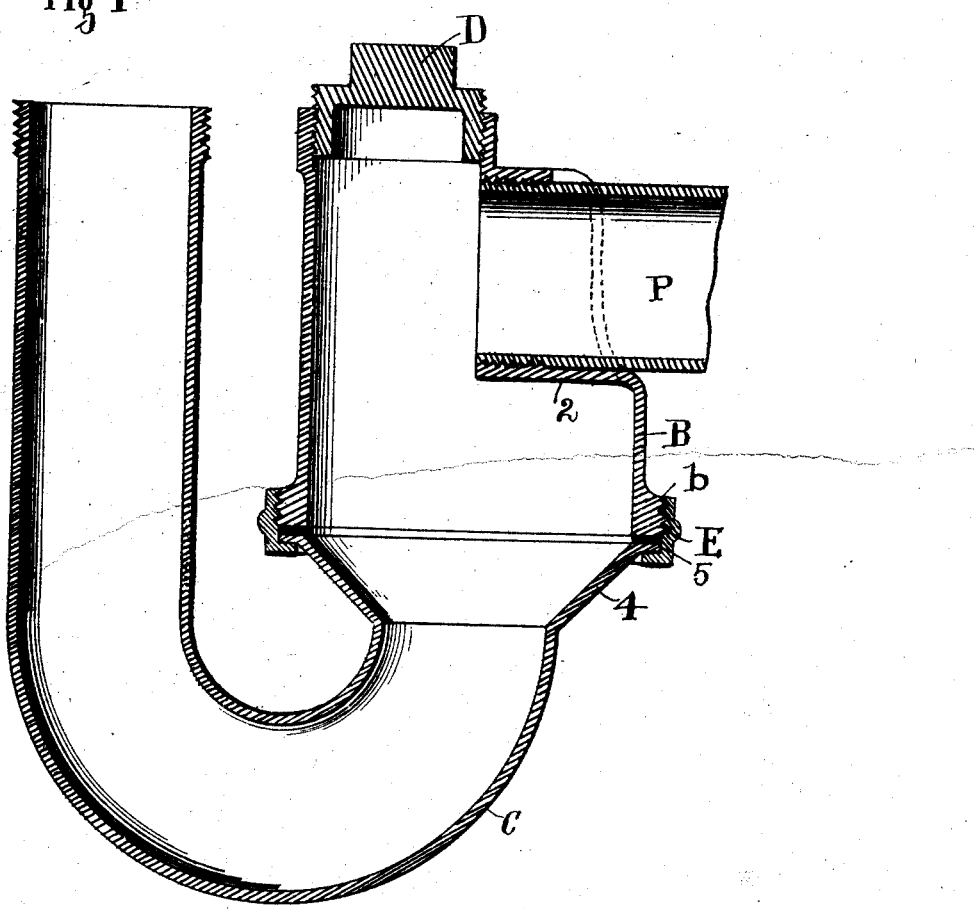
Figure 2:
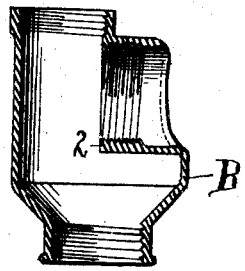

In the accompanying drawings, Figure 1 is a vertical sectional elevation of a trap or waste connection embodying my invention. Fig. 2 is a vertical sectional elevation of the body of the trap showing an ordinary internal screw thread instead of a screw thimble coupling as in Fig. 1.

The invention as thus shown comprises the body B of the trap having the new and original construction more particularly seen at the top thereof in which there is an annular inward extension 2 located in the top of said body and opening laterally through one side thereof and threaded internally to connect waste pipe P therewith. Said extension 2 projects approximately into the center of the said body and has its upper wall forming part of the upper wall of said body, so that there is no space above the extension within said body, and a cleanout hole is provided in the top of said body inward relatively from the mouth of said extension 2 which is closed by a screw plug D. At its bottom the said body B is shown as having an outer thread $b$ for connecting trap member C therewith. Said member has a flaring portion 4 with a flange 5 at the top adapted to be coupled up with the bottom of body B by coupling ring E, and this or any equivalent form or manner of coupling or connecting said parts may be adopted, the idea in any event being to have a connection which will enable said member C to be rotated in respect to body B to make connection with the down pipe that connects therewith and which is liable to occupy any one of many different positions relatively in a radius about said body. Now, in order that the advantage and value of these constructions may be fully appreciated it is to be observed, first, that one of the essential ideas of the invention is to take waste discharge from the trap body in such a manner as to insure the maximum of re-sealing construction with the minimum of superficial surface, consistent with self cleaning action and freedom from secret partitions or deflectors.

I am of course aware that traps have been made wherein the waste pipe extended through the side of the trap or trap body and some distance into it beneath and apart from the top wall of the trap, but this construction was faulty in that it left more or less space above the outlet pipe under the top wall of the body for the accumulation of lint, hair, and like substances, which often find their way into the waste pipe and which would wind around this projecting pipe and gather and hold the slimy substances in the waste discharge, and thus convert the trap from a sanitary device into a cesspool. In addition, this projecting pipe was often found to be eaten away by the action of acids and other deteriorating liquids that are poured through waste pipes, thereby rendering this projection useless for the purpose for which it was intended. Moreover, when such eating away took place it was not made apparent by any leak of water on the floor, which rendered it all the more objectionable. My construction effectually overcomes all of these defects, because there is no possibility of lodgment of hairs, lint and the like as there are no projections to arrest the waste discharge, and if there should be a leak in any part of the trap or waste discharge pipe, it would immediately indicate itself by a leak of water on the floor.

When the trap is placed between floors it is essential that access be had thereto and the waste pipe leading therefrom. The cleanout at the top of the trap is designed for this purpose. Heretofore traps used between floors have been plain traps with a cleanout opening the full diameter of trap, but the present special design of re-sealing construction is a new feature, taking up only a portion of the trap body and requiring a specially designed cleanout, as shown, located at the front of the mouth of the waste extension and conforming to the demands of this new re-sealing construction.

By the word "re-sealing" as used herein I mean that when a siphonic action takes place either by the length of the vertical discharge or the passage of fixture wastes above producing a vacuum, a part of trap seal is siphoned out, until air is admitted through inlet, after which the water held in suspension re-seals the trap to a safe depth.

What I claim is:—

In re-sealing traps, a trap body having an inwardly projecting integral extension at its top and side adapted to make waste pipe connections and forming a part of an interior wall of said body, said inward extension internally threaded about its inner portion and unthreaded about its outer portion, and a waste pipe engaged and sealed in said threaded portion and projected through said unthreaded portion.

In testimony whereof I sign this specification in the presence of two witnesses this 2nd day of April, 1907.

HENRY J. LUFF.

Witnesses:
R. B. MOSER,
F. C. NURSSEM.